United States Patent
Yamanaka et al.

(10) Patent No.: US 12,505,617 B2
(45) Date of Patent: Dec. 23, 2025

(54) INFORMATION PROCESSING DEVICE, INFORMATION PROCESSING METHOD, AND PROGRAM

(71) Applicant: Sony Group Corporation, Tokyo (JP)

(72) Inventors: Daiki Yamanaka, Tokyo (JP); Takashi Seno, Tokyo (JP); Manabu Kawashima, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 146 days.

(21) Appl. No.: 18/683,995

(22) PCT Filed: Mar. 30, 2022

(86) PCT No.: PCT/JP2022/015890
§ 371 (c)(1),
(2) Date: Feb. 15, 2024

(87) PCT Pub. No.: WO2023/032334
PCT Pub. Date: Mar. 9, 2023

(65) Prior Publication Data
US 2024/0378807 A1    Nov. 14, 2024

(30) Foreign Application Priority Data
Aug. 31, 2021  (JP) ................. 2021-141484

(51) Int. Cl.
*G06T 17/05*   (2011.01)
*G06T 3/067*   (2024.01)
*G06T 5/20*    (2006.01)

(52) U.S. Cl.
CPC .............. *G06T 17/05* (2013.01); *G06T 3/067* (2024.01); *G06T 5/20* (2013.01)

(58) Field of Classification Search
CPC ........... G06T 17/05; G06T 3/067; G06T 5/20; G06V 10/25
See application file for complete search history.

(56) References Cited

U.S. PATENT DOCUMENTS

| | | | |
|---|---|---|---|
| 2020/0245885 A1* | 8/2020 | Haeusser | A61B 5/055 |
| 2020/0345261 A1* | 11/2020 | Haeusser | A61B 5/361 |
| 2021/0122364 A1* | 4/2021 | Lee | G06F 18/2413 |

FOREIGN PATENT DOCUMENTS

| | | |
|---|---|---|
| CN | 106599108 A | 4/2017 |
| JP | 2006-011880 A | 1/2006 |

(Continued)

OTHER PUBLICATIONS

Piewak, F., Rehfeld, T., Weber, M. and Zöllner, J.M., Jun. 2017, Fully convolutional neural networks for dynamic object detection in grid maps. In 2017 IEEE Intelligent Vehicles Symposium (IV) (pp. 392-398). IEEE.*

(Continued)

*Primary Examiner* — Sarah Lhymn
(74) *Attorney, Agent, or Firm* — Paratus Law Group, PLLC

(57) ABSTRACT

There is provided a device and the like that reduce the influence of an error set in each voxel in a three-dimensional grid map, during a process of transforming the three-dimensional grid map into a two-dimensional grid map. An information processing device according to one aspect of the present disclosure includes a transform unit. The transform unit performs a convolution process on a three-dimensional grid map and a template. The three-dimensional grid map and the template include a plurality of three-dimensional unit cells each having a value set therein. The transform unit performs the convolution process, to transform the three-dimensional grid map into a two-dimensional grid map (Continued)

including a plurality of two-dimensional unit cells each having a value set therein.

15 Claims, 10 Drawing Sheets

(56) References Cited

FOREIGN PATENT DOCUMENTS

| JP | 2017-119032 A | 7/2017 |
|----|---------------|--------|
| JP | 2018-190432 A | 11/2018 |
| JP | 2019-194788 A | 11/2019 |
| JP | 2020-115353 A | 7/2020 |
| WO | WO 2017/191702 A1 | 11/2017 |

OTHER PUBLICATIONS

Hornung et al., OctoMap: An Efficient Probabilistic 3D Mapping Framework Based on Octrees, Autonomous Robots (2013), 2013, pp. 1-17.

Marching squares, retrieved from Wikipedia <URL: https://en.wikipedia.org/wiki/Marching_squares>, last edited on Aug. 2, 2021, pp. 1-7.

Yang et al., Semantic 3D Occupancy Mapping through Efficient High Order CRFs, arXiv: 1707.07388v1, Jul. 24, 2017, pp. 3-12.

Suganuma, Autonomous vehicle using digital map as a soft infrastructure, Denso Technical Review, 2016, pp. 1-21, vol. 21.

Suganuma, Development of autonomous self-driving car, Oct. 11, 2011, pp. 1-14, Kanazawa University.

* cited by examiner

INFORMATION PROCESSING DEVICE, INFORMATION PROCESSING METHOD, AND PROGRAM

CROSS REFERENCE TO PRIOR APPLICATION

This application is a National Stage Patent Application of PCT International Patent Application No. PCT/JP2022/015890 (filed on Mar. 30, 2022) under 35 U.S.C. § 371, which claims priority to Japanese Patent Application No. 2021-141484 (filed on Aug. 31, 2021), which are all hereby incorporated by reference in their entirety.

TECHNICAL FIELD

The present disclosure relates to an information processing device, an information processing method, and a program.

BACKGROUND ART

A three-dimensional grid map (3D Voxel Grid Map) is a data structure that is used when a three-dimensional space is expressed on a computer, and the three-dimensional space is characteristically divided by three-dimensional unit cells called voxels. Further, each voxel can be made to have a value. For example, in an occupancy grid map that is a type of three-dimensional grid map, each voxel has a value related to whether the voxel is occupied by an object.

More and more three-dimensional grid maps are being used in fields such as computer games and urban design, but three-dimensional grid maps are also transformed into two-dimensional grid maps for reasons such as simplicity of calculation and ease of understanding.

CITATION LIST

Patent Document

Patent Document 1: Japanese Patent Application Laid-Open No. 2018-190432
Patent Document 2: Japanese Patent Application Laid-Open No. 2017-119032
Patent Document 3: Japanese Patent Application Laid-Open No. 2020-115353

Non-Patent Document

Non-Patent Document 1: Naoki SUGANUMA, "Autonomous vehicle using digital map as a soft infrastructure" DENSO TECHNICAL REVIEW Vol. 21 2016, <URL: https://www.denso.com/jp/ja/-/media/global/business/innovation/review/21/21-doc-kL:eynote-02-ja.pdf>
Non-Patent Document 2: Naoki SUGANUMA, "Development of autonomous self-driving vehicle" <URL: http://157.14.26.109/jisedai/docs/lecture_20111011_suganuma.pdf>
Non-Patent Document 3: Hornung Armin, et al. "OctoMap: An efficient probabilistic 3D mapping framework based on octrees." Autonomous robots 34.3 (2013): 189-206.
Non-Patent Document 4: Marching squares, <URL: https://en.wikipedia.org/wiki/Marching_squares>
Non-Patent Document 5: Shichao Yang, et al. "Semantic 3D occupancy mapping through efficient high order CRFs", <URL:https://arxiv.org/abs/1707.07388>

SUMMARY OF THE INVENTION

Problems to be Solved by the Invention

A three-dimensional grid map is generated on the basis of a result of measurement performed by a sensor or the like, but an abnormal value, or an error, might be set in a voxel in some cases due to noise, loss, or the like. Therefore, the accuracy of processing results becomes a problem in processes using three-dimensional grid maps.

The present disclosure provides a device and the like that reduce the influence of an error set in each voxel in a three-dimensional grid map during a process of transforming the three-dimensional grid map into a two-dimensional grid map.

Solutions to Problems

An information processing device according to one aspect of the present disclosure includes a transform unit. The transform unit performs a convolution process on a three-dimensional grid map and a template. The three-dimensional grid map and the template include a plurality of three-dimensional unit cells each having a value set therein. The transform unit performs the convolution process, to transform the three-dimensional grid map into a two-dimensional grid map including a plurality of two-dimensional unit cells each having a value set therein.

Thus, errors of the respective voxels in the three-dimensional grid map can be reduced, and values can be set in the unit cells in the two-dimensional grid map.

Also, the template may include a first horizontal layer including a plurality of three-dimensional unit cells in which the same value is set, the three-dimensional grid map may be an occupancy grid map, and the transform unit may perform the convolution process by associating the three-dimensional unit cells included in the first horizontal layer of the template with the three-dimensional unit cells included in a horizontal layer corresponding to a bottom face in the three-dimensional grid map.

Further, a result of the convolution process in which the respective three-dimensional unit cells included in the first horizontal layer are associated with the respective three-dimensional unit cells in the three-dimensional grid map in which a value indicating occupancy by an object is set may be a higher evaluation value than a result of the convolution process in which the respective three-dimensional unit cells included in the first horizontal layer are associated with the respective three-dimensional unit cells in the three-dimensional grid map in which a value indicating no occupancy by an object is set.

Also, the template may include a second horizontal layer including a plurality of three-dimensional unit cells in which the same value is set, the second horizontal layer being located at a higher position than the first horizontal layer.

Further, a result of the convolution process in which the respective three-dimensional unit cells included in the second horizontal layer are associated with the respective three-dimensional unit cells in the three-dimensional grid map in which a value indicating no occupancy by an object is set may be a higher evaluation value than a result of the convolution process in which the respective three-dimensional unit cells included in the second horizontal layer are associated with the respective three-dimensional unit cells in the three-dimensional grid map in which a value indicating occupancy by an object is set.

Also, the template may include a third horizontal layer including a plurality of three-dimensional unit cells in which the same value is set, the third horizontal layer being located at a lower position than the first horizontal layer.

Further, a result of the convolution process in which the respective three-dimensional unit cells included in the third horizontal layer are associated with the respective three-dimensional unit cells in the three-dimensional grid map in which a value indicating no occupancy by an object is set may be a lower evaluation value than a result of the convolution process in which the respective three-dimensional unit cells included in the third horizontal layer are associated with the respective three-dimensional unit cells in the three-dimensional grid map in which a value indicating occupancy by an object is set.

Also, the template may include a first vertical layer including a plurality of three-dimensional unit cells in which a value indicating no occupancy by an object is set.

The information processing device may further include a determination unit that determines part of the two-dimensional grid map as a region to be extracted, on the basis of the values of the two-dimensional unit cells in the two-dimensional grid map.

The information processing device may further include a determination unit that determines, on the basis of the values of the two-dimensional unit cells in the two-dimensional grid map, at least one of an unoccupied region assumed not to be occupied by an object, or an occupied region indicating occupancy by an object.

Also, the determination unit may determine at least part of the unoccupied region as an allowed region in which a target object may be present.

Further, the allowed region may not include a region in which a three-dimensional unit cell in which a value indicating no occupancy by an object is set is present at a lower position than a horizontal layer corresponding to a bottom face in the three-dimensional grid map.

The information processing device may further include a generation unit that generates the three-dimensional grid map, on the basis of the position of a target object, a gravity direction, and distance measurement information.

Further, another aspect of the present disclosure provides an information processing method that includes a step of performing a convolution process on a three-dimensional grid map including a plurality of three-dimensional unit cells each having a set value and a template including a plurality of three-dimensional unit cells each having a set value, to transform the three-dimensional grid map into a two-dimensional grid map including a plurality of two-dimensional unit cells each having a set value.

Further, yet another aspect of the present disclosure provides a program that is executed by a computer, and includes a step of performing a convolution process on a three-dimensional grid map including a plurality of three-dimensional unit cells each having a set value and a template including a plurality of three-dimensional unit cells each having a set value, to transform the three-dimensional grid map into a two-dimensional grid map including a plurality of two-dimensional unit cells each having a set value.

MODE FOR CARRYING OUT THE INVENTION

The following is a description of an embodiment of the present disclosure, with reference to the drawings.

Embodiment of the Present Invention

Figure 1:
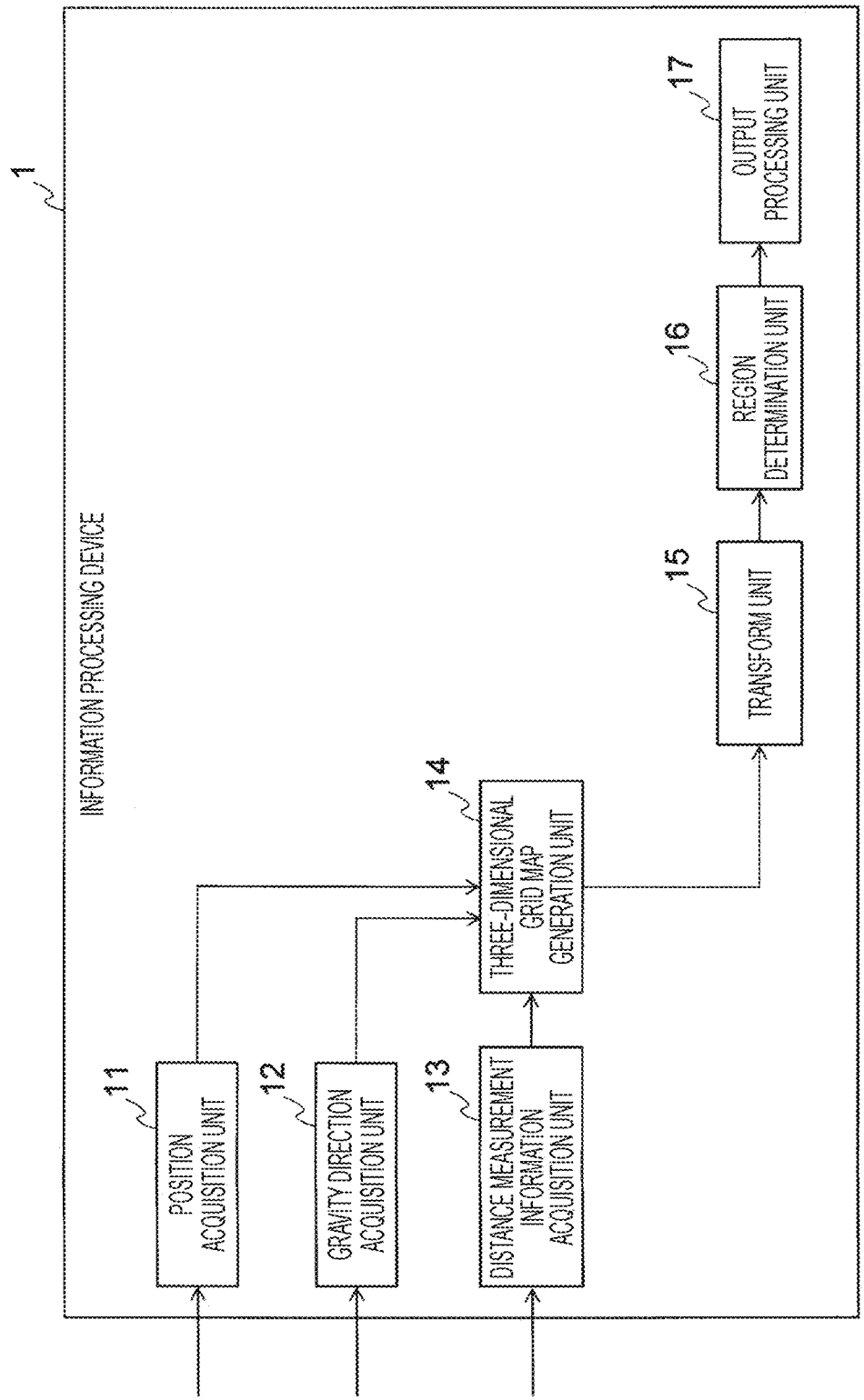
FIG. 1 is a diagram illustrating an example configuration of an information processing device according to an embodiment of the present invention.

FIG. 1 is a diagram illustrating an example configuration of an information processing device according to an embodiment of the present invention. An information processing device 1 in the example in FIG. 1 includes a position acquisition unit 11, a gravity direction acquisition unit 12, a distance measurement information acquisition unit 13, a three-dimensional grid map generation unit 14, a transform unit 15, a region determination unit 16, and an output processing unit 17.

The information processing device 1 of the present embodiment is a device that transforms a three-dimensional grid map (3D VOXEL Grid Map) into a two dimensional map. Hereinafter, a two-dimensional map transformed from a three-dimensional grid map will be referred to as a "two-dimensional grid map" for distinction. The information processing device 1 can also extract a portion of a two-dimensional grid map, and determine the portion as a certain region. The region is disclosed to users and the like, to facilitate understanding of the region.

Note that, in this description, an occupancy grid map (Occupancy Map) that is a type of three-dimensional grid map is mainly described as an example, but the above-described two-dimensional transform is not limited to an occupancy grid map, and can be performed on other three-dimensional grid maps.

Note that, in the present embodiment, it is assumed that a three-dimensional occupancy grid map is also generated by the information processing device 1. However, a three-dimensional occupancy grid map may be generated by a device different from the information processing device 1. That is, the information processing device 1 may acquire a three-dimensional grid map generated by an external device, and perform two-dimensional transform. Further, the information processing device 1 does not necessarily have the configuration illustrated in FIG. 1. Some of the components of the information processing device 1 illustrated in FIG. 1 may be included in a device other than the information processing device 1, or may exist as an independent device. Also, the components illustrated in FIG. 1 may be aggregated or further dispersed in the information processing device 1. Further, components not illustrated or described may also exist in the information processing device 1. For example, one or more memories or storages that store information necessary for processing may exist in the information processing device 1.

A three-dimensional grid map is a data structure that is used when a three-dimensional space is expressed on a computer. The three-dimensional space is characteristically divided into three-dimensional unit cells called voxels. Further, each voxel can be made to have a value. In an occupancy grid map that is a type of three-dimensional grid map, each voxel is set with a value related to a probability that at least part of the voxel is occupied by an object, which is a probability that even part of an object is present in the voxel.

Figure 2:
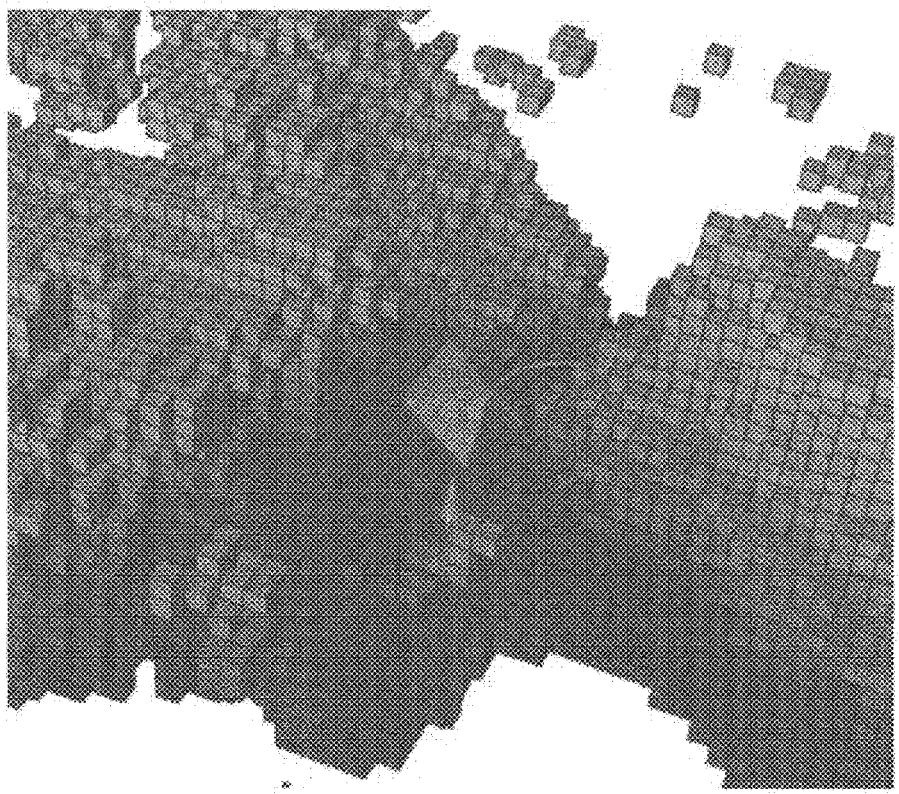
FIG. 2 is a diagram illustrating an example of a three-dimensional grid map.
Figure 2:
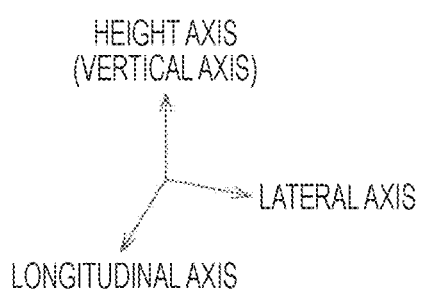

FIG. 2 is a diagram illustrating an example of a three-dimensional grid map. Each of the cubes illustrated in FIG. 2 corresponds to a voxel. Further, the value set in a voxel is represented by a color density, and a darker color represents a greater value. Note that, in the example illustrated in FIG. 2, the voxels with the smallest value are not shown. In other words, in FIG. 2, the voxels in which the smallest value is set are actually present in the portions in which any voxel does not seem to exist. Therefore, in the three-dimensional grid map in FIG. 2, there are portions that seem to have no voxels. Note that, in a case where the values indicate the probability that an object is present, the three-dimensional grid map corresponds to an occupancy grid map.

As described above, the value of a voxel in an occupancy grid map is not a binary value indicating whether or not an object is present, but may be expressed as a probability within a range of 0 to 1. Further, for example, the respective voxels are classified not only into "Occupied" meaning that it is occupied by an object and "Free" meaning that it is not occupied by an object, but also into "Unknown" meaning that it is unknown whether or not it is occupied by an object. For example, a voxel having a probability of presence of an object higher than a first threshold is classified as Occupied, a voxel having a probability of presence of an object lower than a second threshold is classified as Free, and a voxel having a probability of presence of an object equal to or lower than the first threshold and equal to or higher than the second threshold is classified as Unknown.

Figure 3:
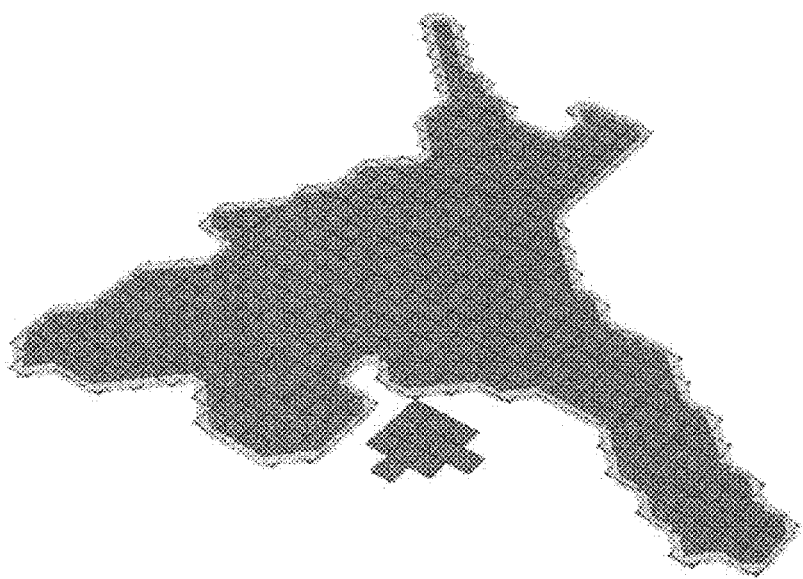
FIG. 3 is a diagram illustrating an example of a two-dimensional grid map.
Figure 3:
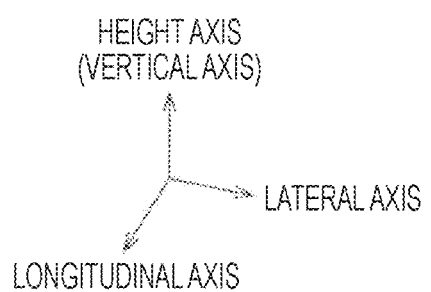

FIG. 3 is a diagram illustrating an example of a two-dimensional grid map. In the example in FIG. 3, the three-dimensional grid map illustrated in FIG. 2 is transformed into a two-dimensional grid map, and part of the two-dimensional grid map is extracted. As illustrated in FIG. 3, the two-dimensional grid map includes a plurality of two-dimensional unit cells. A value can also be set in each two-dimensional unit cell. Accordingly, it is also possible to extract part of the two-dimensional grid map as a certain region, on the basis of the values of the two-dimensional unit cells. In FIG. 3, for example, a region in which more than a predetermined number of voxels having the smallest value set therein (voxels not shown in FIG. 2) are stacked above a reference plane in the three-dimensional grid map in FIG. 2 is extracted. In a case where the three-dimensional grid map in FIG. 2 is an occupancy grid map, regions having an open space above are extracted in the example in FIG. 3.

The transformed two-dimensional grid map can be used in determining various regions. For example, the information processing device 1 can calculate, from the two-dimensional grid map, a safe region in which the target object does not collide with an obstacle. For example, there is a game in which a character displayed on a screen is synchronized with movement of the user, and thus, the character is moved. In a case where the user always performs an action as in this game, the user is immersed in the action so much that the user is not conscious of the surrounding environment, and a problem that the user collides with an object in the surroundings might occur. In particular, in a case where the user enjoys virtual reality (VR) content while wearing a head mounted display (HMD), the user might not be able to see the surrounding environment at all, and therefore, the risk of colliding with an actual object. Therefore, the information processing device 1 may identify a region (an allowed region) in which the target object such as the user does not come in contact with other objects, and the presence thereof does not cause any problem.

In conventional cases, it is difficult to automatically estimate an allowed region in accordance with the actual surroundings without any input from the user, and therefore, an allowed region is manually designated by the user. For example, the user designates an allowed region by drawing a boundary line, using a device such as a game controller. Alternatively, a predetermined range within a radius of several meters from the user is set as an allowed region. Therefore, if it is possible to automatically estimate an allowed region in accordance with the actual surrounding environment like the information processing device 1 of the present embodiment, the user's trouble such as designation of the boundary can be reduced.

Note that, in this description, the values set for the two-dimensional unit cells of a two-dimensional grid map is also referred to as "scores (evaluation values)". Therefore, it can also be said that part of a two-dimensional grid map is extracted on the basis of each score included in the two-dimensional grid map, and is determined as a specific region.

Note that the target object is not limited to any particular object, and may be a person, an animal, or a machine such as an unmanned ground vehicle. Also, for example, a region in which the target object is allowed to move may be set as an allowed region, or a region in which part of the target object can be moved may be set as an allowed region. For example, it is conceivable that a vehicle is set as the target object, and a range in which the vehicle can safely move is set as an allowed region. Also, for example, a range in which the arm of a secured robot arm can be freely moved may be set as an allowed region. Further, a flat ground on which a drone can land may be set as an allowed region.

Figure 4:
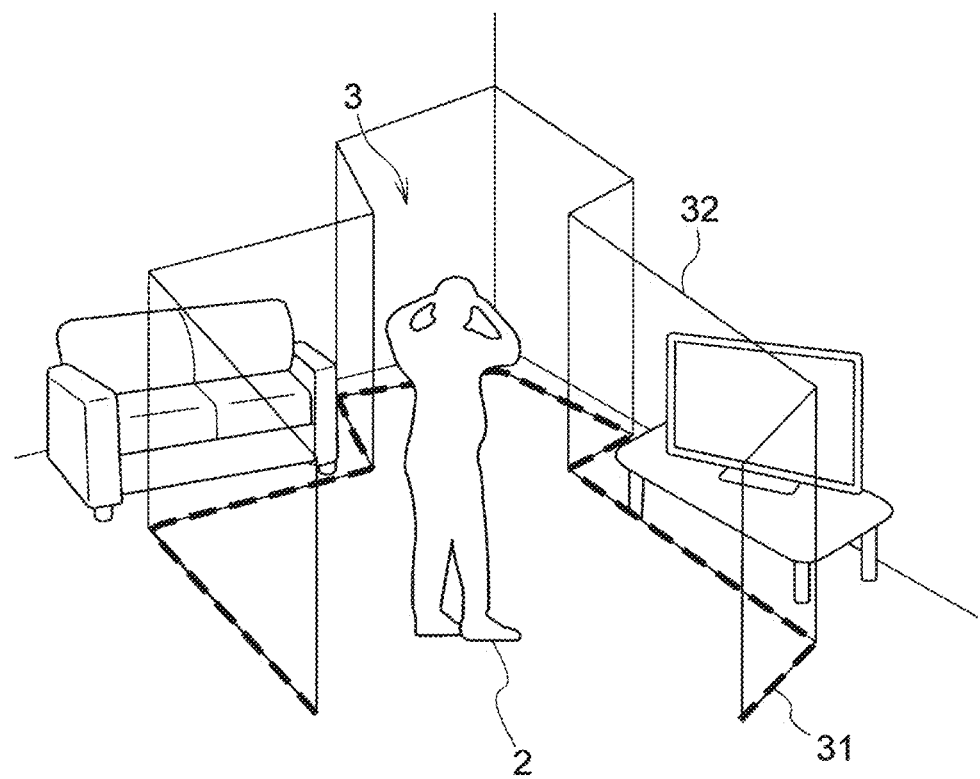
FIG. 4 is a diagram illustrating an example of utilization of an extracted region.

FIG. 4 is a diagram illustrating an example of utilization of an extracted region. In the example in FIG. 4, a user 2 wearing a head mounted display (HMD) is shown. A region 3 in which the user 2 can move or stretch his/her hand without hitting an obstacle is shown with a dashed line 31 and a wall 32. The occupancy grid map corresponding to the room in FIG. 4 is transformed into a two-dimensional grid map, the two-dimensional region defined by the dashed line 31 shown on the floor in FIG. 2 is calculated from the two-dimensional grid map, and the wall 32 vertically extending from the dashed line 31 is generated. In this manner, the three-dimensional region 3 combining the dashed line 31 and the wall 32 can be generated.

A two-dimensional grid map can also be used to determine a route for a mobile structure such as an autonomous mobile robot. For example, it is possible to identify a dangerous region in which obstacles are present, and determine a route along which a mobile structure moves away from the region.

Further, a two-dimensional grid map may be used for improving visibility. For example, a point indicating the position of a mobile structure can be projected onto a two-dimensional grid map, to support an operator who is moving the mobile structure remotely. Also, in a case where it is desired to see a difference between the construction plan and the current state in smart construction, for example, a rendering such as a three-dimensional CAD model and a current construction image may be transformed into occupancy grid maps, and these occupancy grid maps may be compared with each other. In this comparison, it is conceivable that three-dimensional occupancy grid maps are transformed into two-dimensional grid maps to facilitate humans to recognize the difference. Note that the difference between the two occupancy grid maps may be calculated and be then transformed into a two-dimensional grid map. Alternatively, the difference between the transformed two-dimensional grid maps may be calculated, after the occupancy grid map corresponding to the rendering is transformed into a two-dimensional grid map, and the occupancy grid map corresponding to the current construction image is transformed into a two-dimensional grid map.

There are various methods suggested for transforming a three-dimensional grid map into a two-dimensional grid map. For example, a three-dimensional space is partially cut parallel to a plane and is planarized, or is transformed into a two-dimensional map with the focus only on a certain height such as a digital elevation model (DEM) or a height map. Alternatively, a three-dimensional space is imaged as a depth map viewed from a certain point of view, or is transformed into an image viewed from above as a bird's-eye view. However, by such conventional methods, it is not possible to reduce errors of the respective voxels in a three-dimensional grid map, and set values in the unit cells in a two-dimensional grid map.

By the transform method implemented in the present embodiment, on the other hand, errors of the respective voxels in a three-dimensional grid map can be reduced, and values can be set in the unit cells in a two-dimensional grid map. Thus, the accuracy of a region determined on the basis of the values of the unit cells in a two-dimensional grid map can be made higher than an accuracy achieved by any conventional method. Furthermore, in the present embodiment, it is also possible to cope with a step on the floor, unevenness on the ground, and the like.

The respective components of the information processing device 1 are now described. The position acquisition unit 11 acquires the position of the target object in a three-dimensional space. For example, the position acquisition unit 11 may acquire an image in which the target object and the periphery of the target object are captured, and, from the image, estimate an assumed position of the target object in the three-dimensional space around the target object. Also, for example, the position of the target object may be acquired from a satellite positioning system using an aeronautical satellite. In that case, the positions in a reference satellite positioning system provided in advance in the three-dimensional space are also acquired beforehand so that the positional relationship between the target object and the three-dimensional space such as the room in which the target object is present can be seen.

The gravity direction acquisition unit 12 acquires a gravity direction. The gravity direction may be obtained with an inertial measurement unit (IMU) or the like, for example.

The distance measurement information acquisition unit 13 acquires distance measurement information indicating the distance between an object appearing in an image and an imaging device that has captured the image. The distance measurement information can be generated with a distance measuring device such as a stereo camera or a time of flight (ToF) sensor.

Note that a process of estimating the position of the target object may be performed outside the information processing device 1, and the position acquisition unit 11 may simply acquire the estimated position of the target object from the outside. Also, a process of estimating a gravity direction may be performed outside the information processing device 1, and the gravity direction acquisition unit 12 may simply acquire the estimated gravity direction from the outside. Further, a process of generating distance measurement information may be performed outside the information processing device 1, and the distance measurement information acquisition unit 13 may simply acquire the generated distance measurement information from the outside.

Also, for example, a wearable terminal such as a HMD may include a device such as a camera, an IMU, or a distance measuring device for obtaining information to be used for generating a three-dimensional grid map, such as the position of the target object, a gravity direction, and distance measurement information, and the information processing device 1. In that case, the position of the target object matches the imaging position by the device. Therefore, there is no need to prepare a camera for imaging the target object and the surrounding environment to estimate the position of the target object. Further, even in a case where a camera is prepared, if the target object moves out of the imaging range of the camera, the allowed region cannot be updated. Therefore, the device that obtains the information to be used for generating input information is preferably attached to the target object, because the allowed region after movement can be newly determined.

The three-dimensional grid map generation unit 14 generates a three-dimensional grid map such as an occupancy grid map by integrating distance measurement information temporally and spatially on the basis of the position of the target object. A conventional method can be used in generating a three-dimensional grid map. For example, a three-dimensional occupancy grid map can be generated by Octo-Map, which was suggested by Armin Hornung and others. Also, new values may be assigned to the generated three-dimensional grid map. The values to be assigned to the respective voxels are determined in advance. For example, in a case where an occupancy grid map is to be generated, the three-dimensional grid map generation unit 14 may assign 1 to the voxels defined as Occupied, 0 to the voxels defined as Unknown, and −1 to the voxels defined as Free.

Note that generation of a three-dimensional grid map may be performed outside the information processing device 1, and the three-dimensional grid map generation unit 14 may simply acquire the three-dimensional grid map from the outside.

The transform unit 15 transforms a three-dimensional grid map into a two-dimensional grid map. Specifically, the transform unit 15 first applies a plurality of three-dimensional unit cell groups, which are called templates (or kernels) and in which values are set, to an occupancy grid map, to perform a three-dimensional convolution operation.

Figure 5:
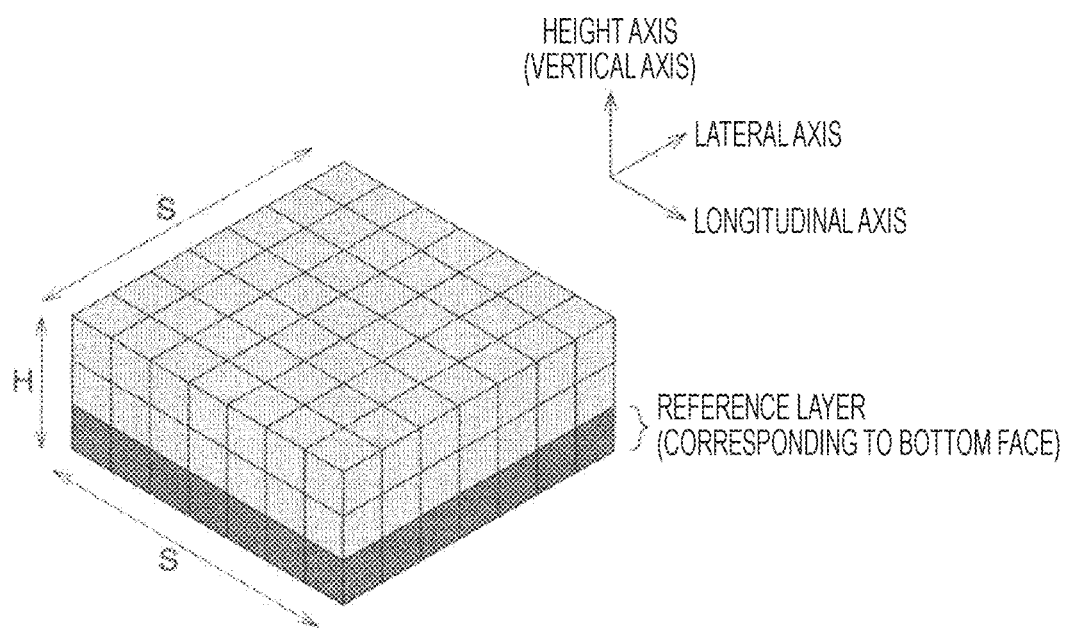
FIG. 5 is a diagram illustrating an example of a template.

FIG. 5 is a diagram illustrating an example of a template. The template in the example in FIG. 5 is used for an occupancy grid map, and is further used for extracting a region in which no objects are present (more specifically, a region in which no obstacles are present above the plane set as the reference plane). The template in the example in FIG. 5 is formed with three-dimensional unit cells including S unit cells arranged in the longitudinal axis direction, S unit cells arranged in the lateral axis direction, and H unit cells arranged in the height axis direction. Further, in the template, there is a horizontal layer to be used for calculation with the plane that is set as the reference plane (document plane) in the occupancy grid map. Hereinafter, the horizontal layer will be referred to as the reference layer (first horizontal layer). In the example in FIG. 5, the lowest horizontal layer corresponds to the reference layer. Further, in the present embodiment, the reference plane (dominant plane) is the bottom face. Therefore, in other words, in a convolution operation, the reference layer of the template is made to correspond to the bottom face in the occupancy grid map. Therefore, in the unit cells of the reference layer, a value (1 in the above example) at which a high score is obtained in a case where the unit cells are made to correspond to Occupied voxels as in the bottom face is set. Note that the high score means that the score obtained in a case where the respective unit cells of the reference layer and the respective voxels of the Occupied voxels are associated with each other is higher than the score obtained in a case where the respective unit cells of the reference layer are associated with each voxel other than the Occupied voxels.

Note that the bottom face is a flat face that supports the target object by gravity, and is assumed to be a floor, a stage in a theater, or the like indoors, and is assumed to be the ground, a road, or the like outdoors.

The bottom face may be designated, or may be estimated from the occupancy grid map. For example, on the assumption that the bottom face has the widest allowed region, two-dimensional grid maps may be generated with the template in positions at varied heights, and the position of the Occupied horizontal layer in which the score of each unit cell in the two-dimensional grid map is the highest may be regarded as the bottom face. Alternatively, the height of the bottom face may be designated with a marker placed on the bottom face, for example. However, it is preferable that the information processing device 1 calculates the height of the bottom face, because it does not take the time and effort to place a marker or the like.

Note that, in an actual environment, there may be a case where the bottom face cannot be expressed with one horizontal layer due to a step, unevenness, or the like. In such a case, a three-dimensional grid map may be divided into a plurality of small spaces in which the bottom face can be expressed with one horizontal layer, and each of the divided small spaces may be transformed into a two-dimensional grid map.

On the reference layer of the template in the example in FIG. 5, there is at least one horizontal layer (second horizontal layer) formed with unit cells in which a value (−1 in the above example) that gives a high score in a case where the unit cells are associated with Free voxels. This is because an allowed region in which movement is possible without obstacles is to be extracted, and, in a case where a space on the bottom face such as a floor is formed with Free voxels, it is considered that movement is possible without obstacles in that space. Note that what values are to be set in the layers other than the reference layer can be appropriately determined depending on the region to be extracted. Further, the high score means that the score obtained in a case where the respective unit cells of the second horizontal layer and the voxels of the Free voxels are associated with each other is higher than the score obtained in a case where the respective unit cells of the second horizontal layer are associated with each voxel other than the Free voxels.

A convolution operation with such a template corresponding the region to be extracted and an occupancy grid map is performed, to obtain the score of each two-dimensional unit cell of a two-dimensional grid map. Note that the convolution operation may be similar to a conventional convolution operation, and the calculation formula may be the inner product of the template and the occupancy grid map as in the following expression.

$$\text{score}[x, z] = \sum_{i,k=-s}^{s} \sum_{j=0}^{H} K[i, j, k] O[i+x, j+y_{floor}, k+z] \quad \text{[Math. 1]}$$

$$s = \frac{S-1}{2}$$

The above expression is the convolution operation formula in a case where the template in the example in FIG. 5 is used. The variables x and z indicate the positions of the longitudinal axis and the lateral axis of the voxels of the three-dimensional grid map, and the constant $y_{floor}$ indicates the position of the bottom face of the height axis of the voxels of the three-dimensional grid map. The variables i and k indicate the positions of the longitudinal axis and the lateral axis of the unit cells in the template, and those variables range from −s to s. Note that s is calculated from the constant S shown in FIG. 4. Further, the variable j indicates the positions of the height axis of the unit cells in the template, and ranges from 0 to H (H being a constant shown in FIG. 4). K [i, j, k] indicates the value that is set in the unit cell at the coordinates (i, j, k) in the template. O [i+x, j+y, k+z] indicates the value that is set in the voxel at the coordinates (i+x, j+$y_{floor}$, k+z) in the occupancy grid map.

Note that the above formula is based on the assumption that the template is slid by the amount equivalent to one unit cell at a time, but the increases in the variables i, j, and k may be adjusted to change the amount by which the template is slid each time.

Further, the size of the template may be determined as appropriate. For example, the size of the template may be adjusted in accordance with the size of the target object. In a case where the height of the target object is known, for example, the value obtained by dividing the height of the target object by the height of a unit cell of the occupancy grid map may be set as the height H of the template. Alternatively, the size of the template may be adjusted on the basis of attributes of the target object. For example, in a case where the target object is a person, the average physique of the target object may be estimated on the basis of attributes such as age, gender, and nationality, and the size of the template may be adjusted in accordance with the estimated physique.

By the convolution operation using such a template, even if there is a voxel in which an incorrect value (also referred to as an abnormal value) is set due to noise or the like, the influence of the voxel can be reduced by the normal values of the surrounding voxels.

Figure 6:
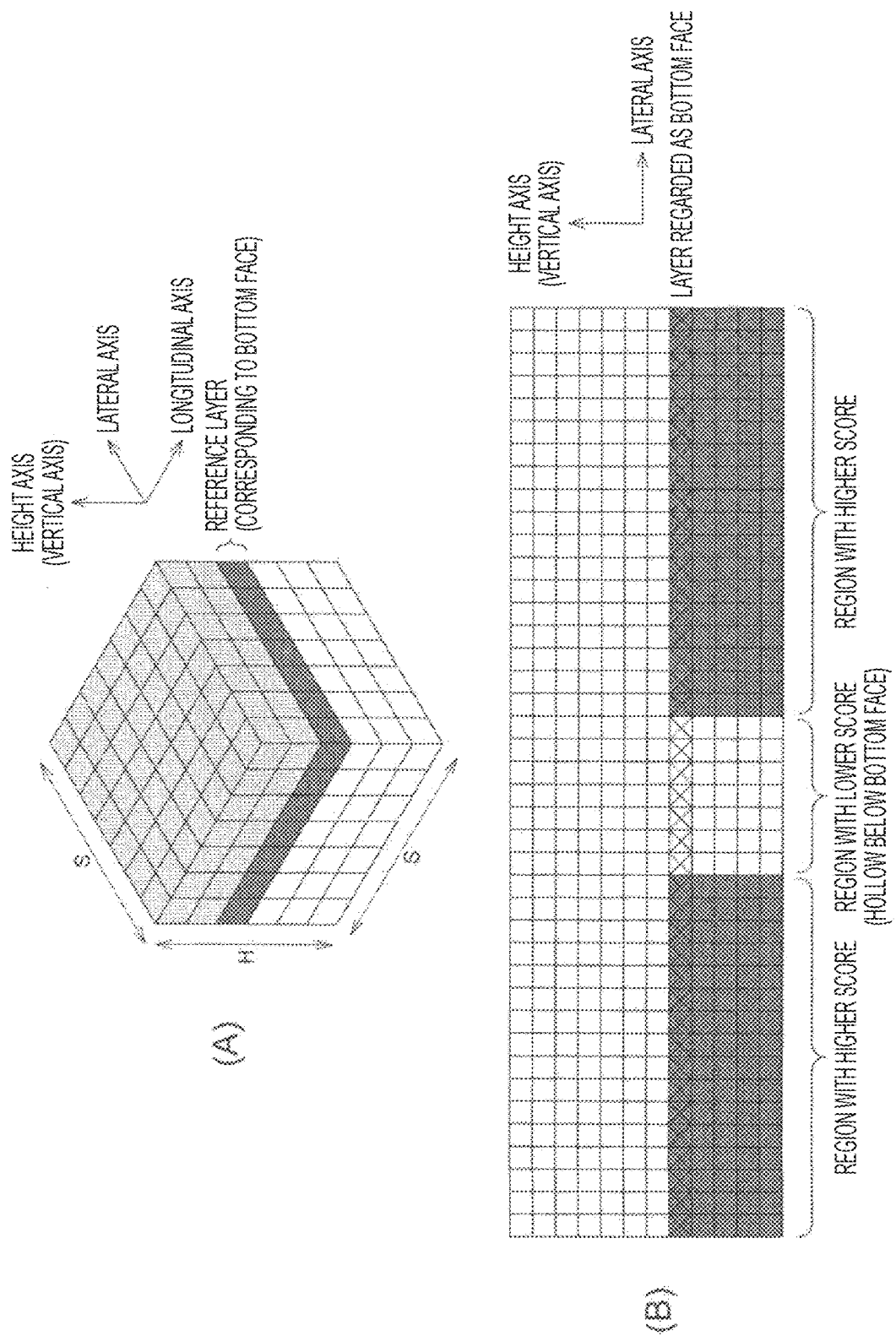
FIG. 6 is a diagram illustrating another example of a template.

FIG. 6 is a diagram illustrating another example of a template. In the template in the example illustrated in FIG. 6(A), unit cells are also present below the reference layer. For example, at least one horizontal layer (third horizontal layer) formed with a plurality of unit cells in which values to be subjected to subtraction in a case where the unit cells are associated with Free voxels are set is provided below the reference layer. Note that the values may be adjusted as appropriate. In a case where such a template is applied to a three-dimensional grid map as illustrated in FIG. 6(B), a region in which free voxels are present below the bottom face, or a region in which the space below the bottom face is hollow has a lower score than the other regions. Therefore, in a case where there is a hole in the floor or a step on the floor, the score of such a region is made lower than the scores of the other regions, and thus, the region of a two-dimensional grid map can be divided. Further, in a case where an allowed region is determined on the basis of the scores, the region with the lower score is excluded from the allowed region, and thus, it is possible to avoid a risk that the target object will fall due to a hole or the like. Note that the lower score means that the score obtained in a case where the respective unit cells of the third horizontal layer and the respective voxels of the Free voxels are associated with each other is lower than the score obtained in a case where the respective unit cells of the third horizontal layer are associated with each voxel other than the Free voxels.

Figure 7:
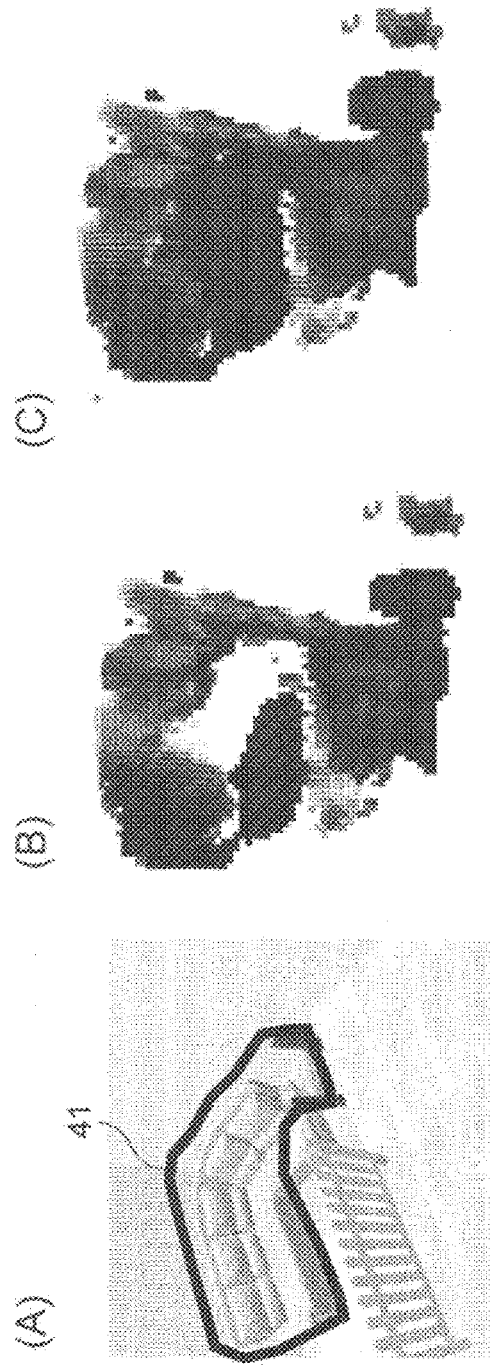
FIG. 7 is a diagram for explaining an effect of a difference between templates.

FIG. 7 is a diagram for explaining an effect of a difference between templates. The room shown in an image in FIG. 7(A) has a loft-like structure, and the floor face on the front side does not extend deep. Therefore, in a case where the floor face on the front side is regarded as the bottom face, the portion surrounded by a frame line 41 does not have a bottom face and is hollow. In a case where the target object moves in such a place, the target object might fall. FIG. 7(B) is a two-dimensional grid map generated with the use of the template illustrated in FIG. 5. Note that The white portions indicates that the score is high. In the template illustrated in FIG. 6, to set a high score in a region in which no obstacles are present above the bottom face, the score of the region corresponding to the portion surrounded by the frame line 41 is high (white in the drawing). On the other hand, FIG. 7(C) is a two-dimensional grid map generated with the use of the template illustrated in FIG. 6(A). In the template illustrated in FIG. 6(A), to set a low score in a region in which the space below the bottom face is hollow, the score of the region corresponding to the portion surrounded by the frame line 41 is low (black in the drawing). Using different templates, it is possible to adjust the score of a two-dimensional grid map.

Figure 8:
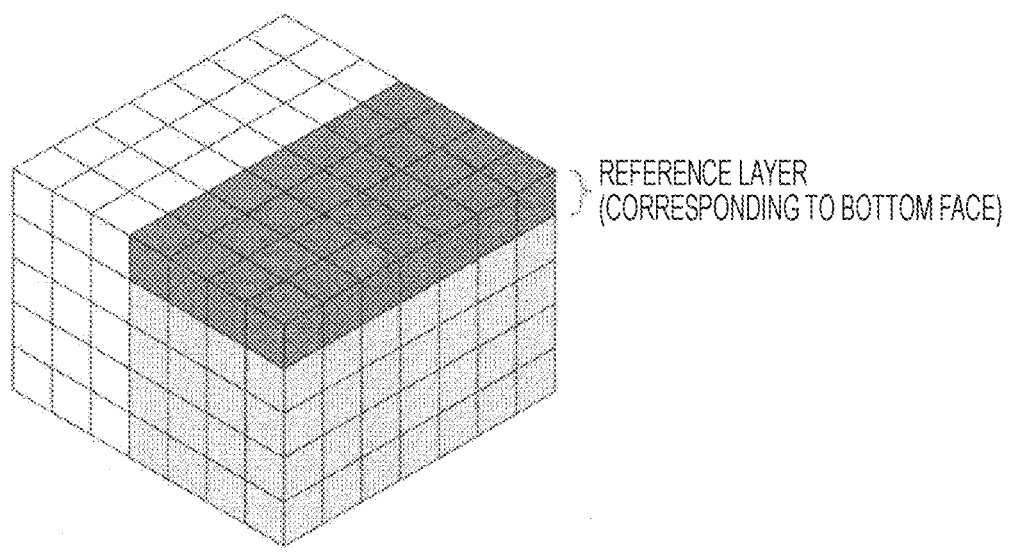
FIG. 8 is a diagram illustrating yet another example of a template.

The configuration of a template can be modified in various manners. FIG. 8 is a diagram illustrating yet another example of a template. In the template in the example illustrated in FIG. 8(A), a value to be subjected to subtraction in a case where the unit cells are made to correspond to Free voxels is set in the left half, the uppermost layer in the right half corresponds to the reference layer, and the value of 0 is set in the unit cells below the reference layer so that the set value of the corresponding voxels does not affect the score. Even with such a template, in a case where there is a hole in the floor or a step on the floor, such a region can have a lower score than the others, and a two-dimensional grid map can be divided into a plurality of regions on the basis of the scores.

As the configuration of a template is changed as above, various states of a three-dimensional space can be estimated, and the accuracy of estimation of the region to be extracted can also be increased.

The region determination unit 16 determines part of a two-dimensional grid map as a specific region, on the basis of the scores of the respective unit cells in the two-dimensional grid map. For example, a condition that two-dimensional unit cells having a score equal to or higher than a predetermined threshold are extracted may be set in advance, and the region determination unit 16 may determine a region including the extracted two-dimensional unit cells as a specific region. Alternatively, the boundary line of the region to be extracted may be determined independently, with the use of Marching Squares or the like, not depending on the frame lines of the unit cells.

Note that it is also conceivable to determine the region to be extracted, using information other than information regarding occupancy of each voxel. For example, in semantic 3D occupancy mapping, a voxel has information called semantics, and information regarding an object occupying the voxel is indicated by the semantics in some cases. For example, it is assumed that the semantics has information "puddle". It is preferable that any puddle is not included in an allowed region. However, a puddle looks like a flat face, a voxel having information about a puddle is highly likely to be recognized as an allowed region. Therefore, when determining an allowed region, the region determination unit 16 may check the voxels at the same horizontal position as the region to be recognized as an allowed region. In a case where the voxels have information "puddle", the region determination unit 16 may perform a process of not including the region in any allowed region.

Note that the region determination unit 16 may not process the semantics information, but the transform unit 15 may process the semantics information. For example, when determining the values to be set in the unit cells in a two-dimensional grid map, the transform unit 15 may lower the score of the unit cells at the same positions as voxels having information about a puddle. Further, in a case where a plurality of voxels having information "vegetation" is present side by side, if the height of the group of the voxels is low, it can be considered that the region is a lawn-like region in which movement is possible. Therefore, in such a case, the transform unit 15 may make the score higher. In this manner, scores may be adjusted in accordance with information regarding a matter other than occupancy.

Further, the boundary of semantics is likely to include more meaningful information. Therefore, the transform unit 15 may divide a three-dimensional space into a small space including the vicinity of the boundary of the semantics and a small space not including the vicinity of the boundary of the semantics, and calculate a two-dimensional grid map for each small space. The region determination unit 16 may then change the process contents, depending on whether or not a two-dimensional grid map includes the vicinity of the boundary of semantics.

The output processing unit 17 outputs a result or processing or the like performed by the information processing device 1. A processing result to be output may be processed. For example, it is conceivable to perform processing to make the region determined by the region determination unit 16 visible in the image used to acquire the distance measurement information.

Figure 9:
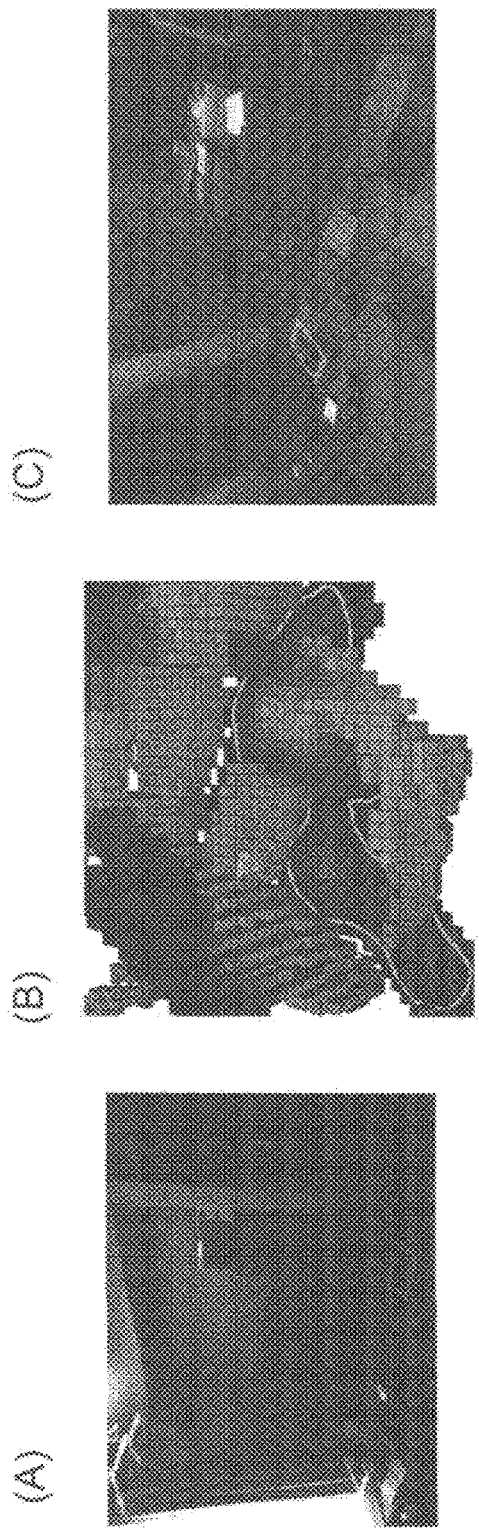
FIG. 9 is a diagram for explaining an output.

FIG. 9 is a diagram for explaining outputs of the information processing device 1. FIG. 9(A) is an image used to generate a three-dimensional grid map, and illustrates a room. FIG. 9(B) is an occupancy grid map that has been generated on the basis of the image in FIG. 9(A), and corresponds to the room. Note that the white line shown in FIG. 9(B) indicates the region determined by the region determination unit 16, not the information included in the occupancy grid map, and can be generated with the use of Marching Squares or the like as described above. Note that a region in which no obstacles are present above the bottom face is shown herein.

FIG. 9(C) is a diagram illustrating an example output of an allowed region calculated on the basis of the occupancy grid map of FIG. 9(B). Although the orientation is different from that of the image shown in FIG. 9(A), an allowed region that is surrounded by a white line and has a white cross pattern is combined with the image showing the same room as the room shown in FIG. 9(A). In this manner, an image that has been processed to be more easily understood by a human may be output.

Figure 10:
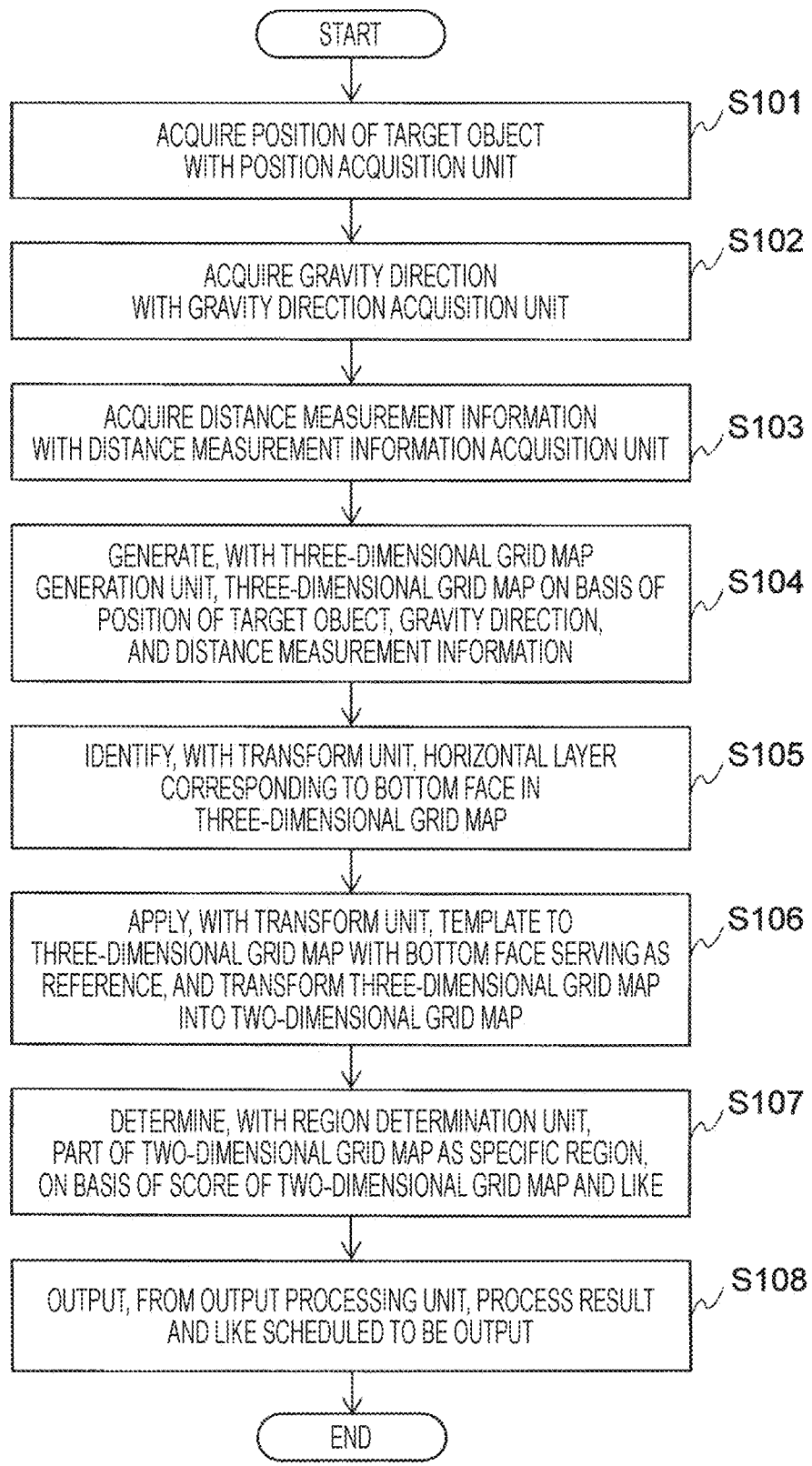
FIG. 10 is a schematic flowchart of an overall process to be performed by the information processing device according to the present embodiment.

Next, a processing flow is described. FIG. 10 is a schematic flowchart of an overall process to be performed by the information processing device 1 according to the present embodiment. Note that this flow can be executed many times, with the trigger being a lapse of time, movement of the target object or an object in the surroundings, or the like.

A position estimation unit acquires the position of the target object (S101), the gravity direction acquisition unit 12 acquires a weight direction (S102), and the distance measurement information acquisition unit 13 acquires distance measurement information (S103). The three-dimensional grid map generation unit 14 generates a three-dimensional grid map, on the basis of the position of the target object, the weight direction, and the distance measurement information (S104).

The transform unit 15 identifies the horizontal layer corresponding to the bottom face in the generated three-dimensional grid map (S15). In a case where the height of the bottom face is designated, the horizontal layer at the designated height is only required to be regarded as the bottom face. In a case where the height of the bottom face is not designated, the bottom face may be determined by a predetermined method of calculating scores while changing the height to which a template is applied as described above. The transform unit 15 then transforms the three-dimensional grid map into a two-dimensional grid map by applying the template to the three-dimensional grid map with reference to the bottom face (S106). Note that, in a case where there is a plurality of templates, the transform unit 15 is only required to select the template to be used, in accordance with designation from the outside, the purpose of use of the two-dimensional grid map, or the like. The templates may be stored in a memory device such as a storage (not shown in the drawings).

The region determination unit 16 extracts part of the two-dimensional grid map on the basis of the score of the generated two-dimensional grid map or the like, and determines the part as a specific region such as an allowed region (S106). Note that adjustment may be performed to make the specific region smaller than that at the time of extraction, for a reason such as enhancement of safety or the like. The output processing unit 17 then outputs a processing result scheduled to be output, among the results of processing of the three-dimensional grid map, the two-dimensional grid map, the extracted region, and the like. At that point of time, the output result may be processed by a predetermined method as illustrated in FIG. 9. In this manner, this flow comes to an end.

As described above, according to the present embodiment, a three-dimensional grid map such as an occupancy grid map is transformed into a two-dimensional grid map, and some region is determined from the two-dimensional grid map. With the use of a template specialized for determining a region to be extracted at the time of transform into a two-dimensional grid map, it is possible to reduce the influence of an error or the like included in the three-dimensional grid map, and increase the accuracy of the extracted region.

Note that, in recent years, techniques of machine learning using a deep neural network have evolved, and transform from input data to output data is replaced with a trained deep neural network. In the present application, processes of calculating a score from an occupancy grid map and calculating an allowed region from the calculated scores are performed. However, but these processes can be replaced with a trained deep neural network. That is, it is possible to generate an estimation model based on a deep neural network that stores occupancy grid maps and the scores or regions calculated from the occupancy grid maps, and outputs the score or the region corresponding to an input occupancy grid map by machine learning using the stored scores or regions as training data. Accordingly, after the training of the estimated model is completed, the corresponding scores or allowed region can be calculated from an occupancy grid map using the estimation model, without use of any template.

Processes to be performed by the respective devices in the embodiment of the present disclosure can be performed by software (a program) to be executed by a central processing unit (CPU), a graphics processing unit (GPU), or the like. Note that not all the processes by the devices are performed by software, but some of the processes may be executed by hardware such as a dedicated circuit.

Note that the embodiment described above concerns an example for embodying the present disclosure, and the present disclosure can be implemented in various other modes. For example, various modifications, substitutions, omissions, or combinations thereof can be made without departing from the gist of the present disclosure. Modes in which such modifications, replacements, omissions, and the like have been made are also included in the scope of the present disclosure, and are also included in the inventions disclosed in the claims and the equivalents thereof.

Note that the present disclosure can have the following configurations.

[1]
An information processing device including
a transform unit that performs a convolution process on a three-dimensional grid map including a plurality of three-dimensional unit cells each having a set value and a template including a plurality of three-dimensional unit cells each having a set value, to transform the three-dimensional grid map into a two-dimensional grid map including a plurality of two-dimensional unit cells each having a set value.

[2]
The information processing device according to [1], in which
the template includes a first horizontal layer including a plurality of three-dimensional unit cells in which the same value is set,
the three-dimensional grid map is an occupancy grid map, and
the transform unit performs the convolution process by associating the three-dimensional unit cells included in the first horizontal layer of the template with the three-dimensional unit cells included in a horizontal layer corresponding to a bottom face in the three-dimensional grid map.

[3]
The information processing device according to [2], in which
a result of the convolution process in which the respective three-dimensional unit cells included in the first horizontal layer are associated with the respective three-dimensional unit cells in the three-dimensional grid map in which a value indicating occupancy by an object is set is a higher evaluation value than a result of the convolution process in which the respective three-dimensional unit cells included in the first horizontal layer are associated with the respective three-dimensional unit cells in the three-dimensional grid map in which a value indicating no occupancy by an object is set.

[4]
The information processing device according to [2] or [3], in which
the template includes a second horizontal layer including a plurality of three-dimensional unit cells in which the same value is set, the second horizontal layer being located at a higher position than the first horizontal layer.

[5]
The information processing device according to [4], in which
a result of the convolution process in which the respective three-dimensional unit cells included in the second horizontal layer are associated with the respective three-dimensional unit cells in the three-dimensional grid map in which a value indicating no occupancy by an object is set is a higher evaluation value than a result of the convolution process in which the respective three-dimensional unit cells included in the second horizontal layer are associated with the respective three-dimensional unit cells in the three-dimensional grid map in which a value indicating occupancy by an object is set.

[6]
The information processing device according to [2], in which
the template includes a third horizontal layer including a plurality of three-dimensional unit cells in which the same value is set, the third horizontal layer being located at a lower position than the first horizontal layer.

[7]
The information processing device according to [6], in which
a result of the convolution process in which the three-dimensional unit cells included in the third horizontal layer are associated with the three-dimensional unit cells in the three-dimensional grid map in which a value indicating no occupancy by an object is set is a lower evaluation value than a result of the convolution process in which the three-dimensional unit cells included in the third horizontal layer are associated with the three-dimensional unit cells in the three-dimensional grid map in which a value indicating occupancy by an object is set.

[8]
The information processing device according to any one of [2] to [7], in which
the template includes a first vertical layer including a plurality of three-dimensional unit cells in which a value indicating no occupancy by an object is set.

[9]
The information processing device according to any one of [1] to [8], further including
a determination unit that determines part of the two-dimensional grid map as a region to be extracted, on the basis of the values of the two-dimensional unit cells in the two-dimensional grid map.

[10]
The information processing device according to any one of [1] to [9], further including
a determination unit that determines, on the basis of the values of the two-dimensional unit cells in the two-dimensional grid map, at least one of an unoccupied region assumed not to be occupied by an object, or an occupied region indicating occupancy by an object.

[11]
The information processing device according to [10], in which
the determination unit determines at least part of the unoccupied region as an allowed region in which a target object may be present.

[12]
The information processing device according to [11], in which
the allowed region does not include a region in which a three-dimensional unit cell in which a value indicating no occupancy by an object is set is present at a lower position than a horizontal layer corresponding to a bottom face in the three-dimensional grid map.

[13]
The information processing device according to any one of [1] to [12], further including
a generation unit that generates the three-dimensional grid map, on the basis of a position of a target object, a gravity direction, and distance measurement information.

[14]
An information processing method including
a step of performing a convolution process on a three-dimensional grid map including a plurality of three-dimensional unit cells each having a set value and a template including a plurality of three-dimensional unit cells each having a set value, to transform the three-dimensional grid map into a two-dimensional grid map including a plurality of two-dimensional unit cells each having a set value.

[15]
A program to be executed by a computer, the program including
a step of performing a convolution process on a three-dimensional grid map including a plurality of three-dimensional unit cells each having a set value and a template including a plurality of three-dimensional unit cells each having a set value, to transform the three-dimensional grid map into a two-dimensional grid map including a plurality of two-dimensional unit cells each having a set value.

REFERENCE SIGNS LIST

1 Information processing device
11 Position acquisition unit
12 Gravity direction acquisition unit
13 Distance measurement information acquisition unit
14 Three-dimensional grid map generation unit
15 Transform unit
16 Region determination unit
17 Output processing unit
2 User
3 Example of an allowed region
31 Dashed line
32 virtual wall
41 Frame line

The invention claimed is:
1. An information processing device comprising
a transform unit that performs a convolution process on a three-dimensional grid map including a plurality of three-dimensional unit cells each having a set value and a template including a plurality of three-dimensional unit cells each having a set value, to transform the three-dimensional grid map into a two-dimensional grid map including a plurality of two-dimensional unit cells each having a set value.

2. The information processing device according to claim 1, wherein
the template includes a first horizontal layer including a plurality of three-dimensional unit cells in which the same value is set,
the three-dimensional grid map includes an occupancy grid map, and
the transform unit performs the convolution process by associating the three-dimensional unit cells included in the first horizontal layer of the template with the three-dimensional unit cells included in a horizontal layer corresponding to a bottom face in the three-dimensional grid map.

3. The information processing device according to claim 2, wherein
a result of the convolution process in which the respective three-dimensional unit cells included in the first horizontal layer are associated with the respective three-dimensional unit cells in the three-dimensional grid map in which a value indicating occupancy by an object is set is a higher evaluation value than a result of the convolution process in which the respective three-dimensional unit cells included in the first horizontal layer are associated with the respective three-dimensional unit cells in the three-dimensional grid map in which a value indicating no occupancy by an object is set.

4. The information processing device according to claim 2, wherein
the template includes a second horizontal layer including a plurality of three-dimensional unit cells in which the same value is set, the second horizontal layer being located at a higher position than the first horizontal layer.

5. The information processing device according to claim 4, wherein
a result of the convolution process in which the respective three-dimensional unit cells included in the second horizontal layer are associated with the respective three-dimensional unit cells in the three-dimensional grid map in which a value indicating no occupancy by an object is set is a higher evaluation value than a result of the convolution process in which the respective three-dimensional unit cells included in the second horizontal layer are associated with the respective three-dimensional unit cells in the three-dimensional grid map in which a value indicating occupancy by an object is set.

6. The information processing device according to claim 2, wherein
the template includes a third horizontal layer including a plurality of three-dimensional unit cells in which the same value is set, the third horizontal layer being located at a lower position than the first horizontal layer.

7. The information processing device according to claim 6, wherein
a result of the convolution process in which the respective three-dimensional unit cells included in the third horizontal layer are associated with the respective three-dimensional unit cells in the three-dimensional grid map in which a value indicating no occupancy by an object is set is a lower evaluation value than a result of the convolution process in which the respective three-dimensional unit cells included in the third horizontal layer are associated with the respective three-dimensional unit cells in the three-dimensional grid map in which a value indicating occupancy by an object is set.

8. The information processing device according to claim 2, wherein
the template includes a first vertical layer including a plurality of three-dimensional unit cells in which a value indicating no occupancy by an object is set.

9. The information processing device according to claim 1, further comprising
a determination unit that determines part of the two-dimensional grid map as a region to be extracted, on a basis of the values of the two-dimensional unit cells in the two-dimensional grid map.

10. The information processing device according to claim 1, further comprising
a determination unit that determines, on a basis of the values of the two-dimensional unit cells in the two-dimensional grid map, at least one of an unoccupied region assumed not to be occupied by an object, or an occupied region indicating occupancy by an object.

11. The information processing device according to claim 10, wherein
the determination unit determines at least part of the unoccupied region as an allowed region in which a target object may be present.

12. The information processing device according to claim 11, wherein
the allowed region does not include a region in which a three-dimensional unit cell in which a value indicating no occupancy by an object is set is present at a lower position than a horizontal layer corresponding to a bottom face in the three-dimensional grid map.

13. The information processing device according to claim 1, further comprising
a generation unit that generates the three-dimensional grid map, on a basis of a position of a target object, a gravity direction, and distance measurement information.

14. An information processing method comprising
a step of performing a convolution process on a three-dimensional grid map including a plurality of three-dimensional unit cells each having a set value and a template including a plurality of three-dimensional unit cells each having a set value, to transform the three-dimensional grid map into a two-dimensional grid map including a plurality of two-dimensional unit cells each having a set value.

15. A non-transitory memory device storing a program to be executed by a computer, the program including a step of performing a convolution process on a three-dimensional grid map including a plurality of three-dimensional unit cells each having a set value and a template including a plurality of three-dimensional unit cells each having a set value, to transform the three-dimensional grid map into a two-dimensional grid map including a plurality of two-dimensional unit cells each having a set value.

* * * * *